(12) United States Patent
Kober et al.

(10) Patent No.: US 7,841,643 B2
(45) Date of Patent: Nov. 30, 2010

(54) OPERATING LINKAGE ASSEMBLY FOR A MOVABLE ROOF

(75) Inventors: Tobias Kober, Ditzingen (DE); Gernot Bruder, Karlsruhe (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 92 days.

(21) Appl. No.: 12/367,004

(22) Filed: Feb. 6, 2009

(65) Prior Publication Data

US 2009/0200829 A1    Aug. 13, 2009

(30) Foreign Application Priority Data

Feb. 7, 2008    (DE) .................... 10 2008 007 949

(51) Int. Cl.
*B60J 7/12* (2006.01)
(52) U.S. Cl. .................................. 296/108; 296/107.01
(58) Field of Classification Search . 296/107.01–107.2, 296/108, 109, 111, 136.1, 136.13
See application file for complete search history.

(56) References Cited

U.S. PATENT DOCUMENTS

| 3,328,072 A | 6/1967 | Adamski |
| 5,286,077 A | 2/1994 | Kinnanen |
| 5,785,375 A | 7/1998 | Alexander et al. |
| 6,572,175 B2 | 6/2003 | Schutt et al. |
| 2002/0030381 A1 | 3/2002 | Schutt et al. |
| 2006/0097542 A1 * | 5/2006 | Dilluvio ................ 296/107.09 |

FOREIGN PATENT DOCUMENTS

| DE | 43 04 028 | 9/1993 |
| DE | 199 13 274 | 7/2000 |
| DE | 100 42460 | 3/2002 |
| DE | 101 02 643 | 7/2002 |

* cited by examiner

*Primary Examiner*—Lori L Lyjak
(74) *Attorney, Agent, or Firm*—Brooks Kushman P.C.

(57) ABSTRACT

A folding roof linkage assembly includes front and rear frames and first and second arms. The front frame has a rear portion extending at an acute angle therefrom and having front and rear ends. The rear frame has a front portion extending perpendicularly therefrom and having bottom and top ends. The first arm has a front end pivotally connected to the front end of the front frame and a rear end pivotally connected to the bottom end of the rear frame. The second arm has a front end pivotally connected to the rear end of the front frame and a rear end pivotally connected to the top end of the rear frame. The front frame is movable between a closed position in which the frames extend from one another and an opened position in which the front frame folds over the rear frame.

18 Claims, 6 Drawing Sheets

OPERATING LINKAGE ASSEMBLY FOR A MOVABLE ROOF

CROSS-REFERENCE TO RELATED APPLICATIONS

This application claims foreign priority benefits under 35 U.S.C. §119(a)-(d) to DE 10 2008 007 949.9, filed Feb. 7, 2008, which is hereby incorporated by reference in its entirety.

BACKGROUND OF THE INVENTION

1. Field of the Invention

The present invention relates to an operating linkage assembly for a movable roof of a vehicle.

2. Background Art

DE 199 13 274 C1 describes a rollover-type folding top having a linkage assembly adjustable between closed and opened positions of the folding top. The linkage assembly includes rotationally coupled side roof supports. Two outer arms of a four-bar kinematic linkage system are respectively connected to a side roof support. A middle arm is brought together rotationally with the two outer arms. Rotational axes of articulated joints are offset-mounted with respect to one another between a middle control lever and an outer arm.

DE 43 04 028 B4 (corresponding to U.S. Pat. No. 5,286,077) describes a mechanism for a backward-type folding top. The mechanism includes frame elements each having side bars oriented in the longitudinal vehicle direction.

SUMMARY OF THE INVENTION

An object of the present invention includes an operating linkage assembly for a movable roof of a vehicle in which the linkage assembly has a lever assembly acting between a first roof element with controlled rollover and a second roof element to assure uniform motion during the swiveling motion of the roof between an opened position and a closed position.

In carrying out the above object and other objects, the present invention provides a linkage assembly for a folding roof. The linkage assembly includes front and rear frame elements and first and second linkage arms. The front frame element has a rear end portion extending at an acute angle therefrom. The rear end portion having a front end joined to the front frame element and a rear end. The rear frame element has a front end portion extending substantially at a right angle therefrom. The front end portion has a bottom end joined to the rear frame element and a top end. The first linkage arm has a front end and a rear end. The front end of the first linkage arm is pivotally connected to the front end of the rear end portion of the front frame element. The rear end of the first linkage arm is pivotally connected to the bottom end of the front end portion of the rear frame element. The second linkage arm has a front end and a rear end. The front end of the second linkage arm is pivotally connected to the rear end of the rear end portion of the front frame element. The rear end of the second linkage arm is pivotally connected to the top end of the front end portion of the rear frame element. The front frame element is movable relative to the rear frame element via the pivotal connections of the linkage arms and the end portions of the frame elements between a closed position in which the frame elements are extended from one another along a longitudinal direction and an opened position in which the front frame element is folded over the rear frame element with the rear end portion of the front frame element being folded over the front end portion of the rear frame element.

Further, in carrying out the above object and other objects, the present invention provides a folding roof having a pair of the linkage assemblies.

Advantages achieved by a linkage assembly of a movable roof in accordance with embodiments of the present invention include a smooth flow of motion of the roof elements with respect to one another due to the arrangement and design of the roof frame elements and the rods of the four-bar linkage mechanism of the lever assembly comprising the linkage assembly. Thus, for example, during the motion of the roof into the closed position, an abrupt unloading triggering a type of snapping effect is counteracted in the linkage assembly that works cooperatively with the soft top cover, the roof elements, and a control rod. An overstretching of material is reduced by the instantaneous center of rotation lying in the vicinity of the virtual effective line of action of the tension in the material of the soft top cover. The design of the linkage assembly in connection with the control rod can be achieved with little effort. In addition, a stop between the roof elements in the closed roof position enables selective mutual support for these elements, wherein measurement tolerances that might differ from design conditions can be compensated by an adjusting device.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
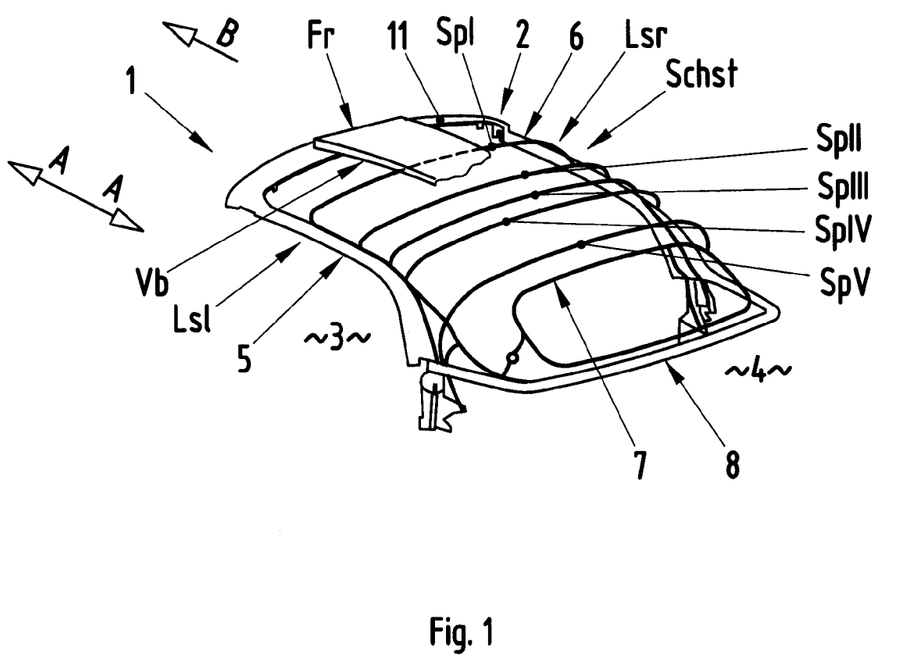
FIG. 1 illustrates an oblique view of a movable roof in accordance with an embodiment of the present invention.

Referring now to FIG. 1, an oblique view of a movable roof 2 in accordance with an embodiment of the present invention is shown. Roof 2 is a collapsible folding roof Fr having a soft top cover Vb. Roof 2 is movably connected to a vehicle 1 to move between a closed position Schst (shown in FIGS. 1 and 2) and an opened position Ost (shown in FIG. 3). In the closed position Schst, roof 2 is extended and covers a passenger compartment 3 of vehicle 1. In the opened position Ost, roof 2 is collapsed and is stored within a rear storage space 4 of vehicle 1.

Roof 2 includes first and second operating linkage assemblies 5, 6. First linkage assembly 5 extends along a first longitudinal side Ls1 of roof 2 in the longitudinal vehicle direction A-A. Second linkage assembly 6 extends along an opposite second longitudinal side Lsr of roof 2 in the longitudinal vehicle direction A-A. Linkage assemblies 5, 6 are the same as one another and, as a result, only first linkage assembly 5 is described in greater detail.

Roof 2 includes a plurality of convertible top bows SpI, SpII, SpIII, SpIV, and SpV. The bows extend between linkage assemblies 5, 6 and are aligned at right angles relative to the longitudinal vehicle direction A-A. The bows are connected to linkage assemblies 5, 6 and support soft top cover Vb. Roof 2 further includes a bracket 8 supporting a rear window frame 7 which are connected per soft top cover Vb.

Figures 2, 3:
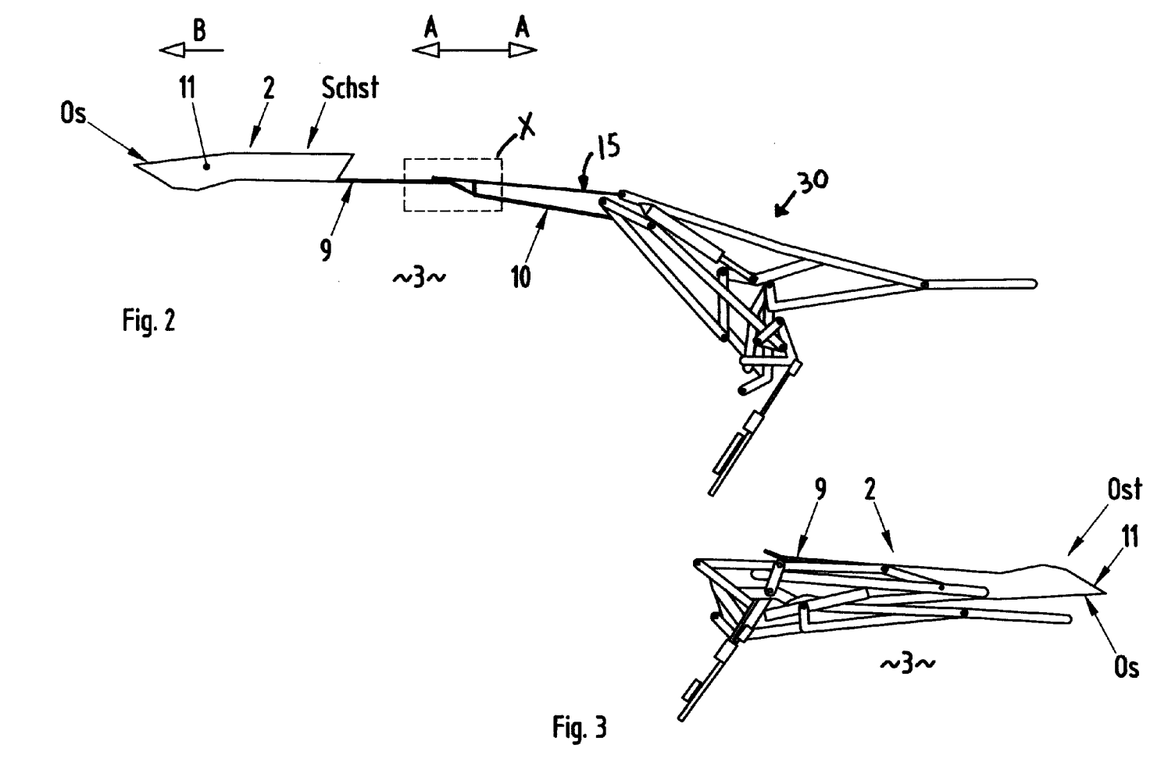
FIG. 2 illustrates a side view of the roof in a closed position.
FIG. 3 illustrates a side view of the roof in an opened position.
Figure 4:
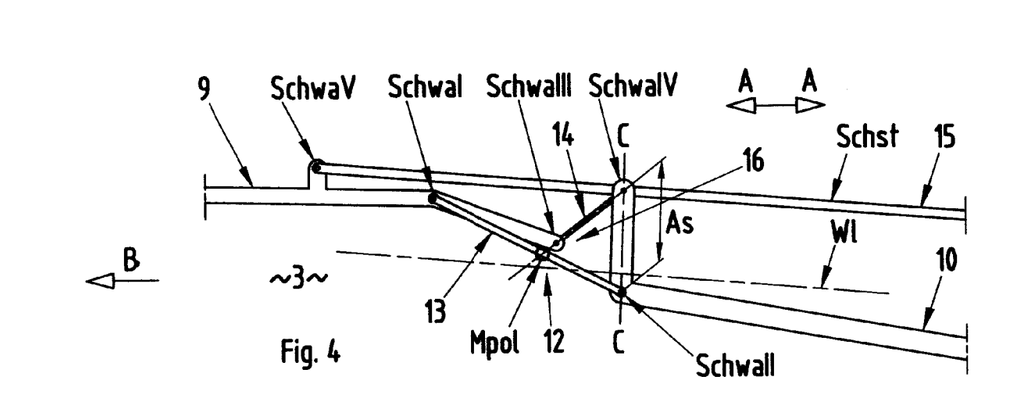
FIG. 4 illustrates an enlarged view of a portion of an operating linkage assembly of the roof within the detail X of FIG. 2 with the roof in the closed position.

Referring now to FIGS. 2 and 3, with continual reference to FIG. 1, linkage assembly 5 includes a front roof frame element 9 and a rear roof frame element 10 as viewed in the direction of forward vehicle travel B. Front frame element 9 includes a roof canopy 11 which is connectable to the windshield frame of vehicle 1 when roof 2 is in the closed position. Roof canopy 11 includes an upper side Os which faces away from the roadway when roof 2 is in the closed position Schst. Frame elements 9, 10 are movable with respect to one another such that front frame element 9 performs a rollover motion relative to rear frame element 10 when roof 2 is moved between the closed position Schst and the opened position Ost. For instance, front frame element 9 is shifted through an angular range of 180° to lie over (i.e., rollover) rear frame element 10 with upper side Os of roof canopy 11 facing toward the roadway when roof 2 is moved from the closed position Schst to the opened position Ost. Similarly, front frame element 9 is shifted back through the angular range of 180° to extend from rear frame element 10 with upper side Os of roof canopy 11 facing away from the roadway when roof 2 is moved from the opened position Ost to the closed position Schst.

Figure 5:
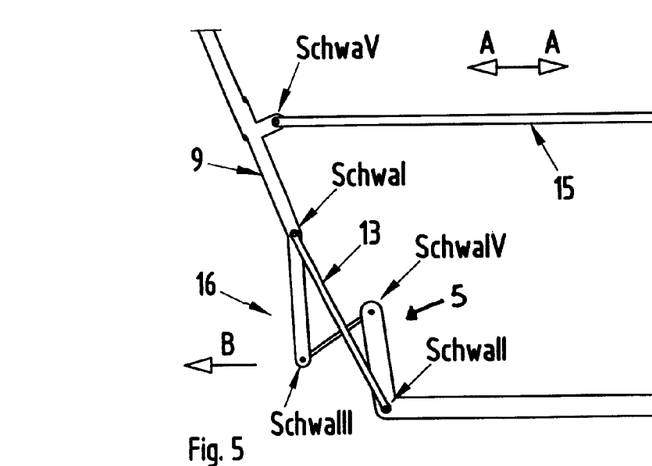
FIG. 5 illustrates an enlarged view of the portion of the operating linkage assembly within the detail X of FIG. 2 with the roof in an intermediate position between the closed and opened positions.
Figure 6:
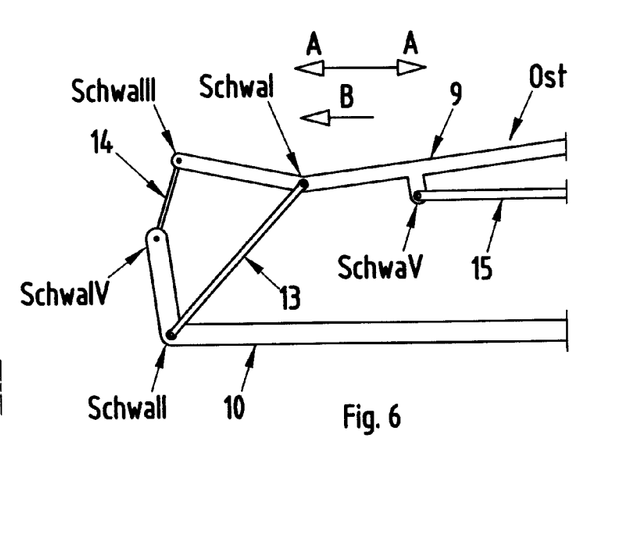
FIG. 6 illustrates an enlarged view of the portion of the operating linkage assembly within the detail X of FIG. 2 with the roof in the opened position.
Figure 7:
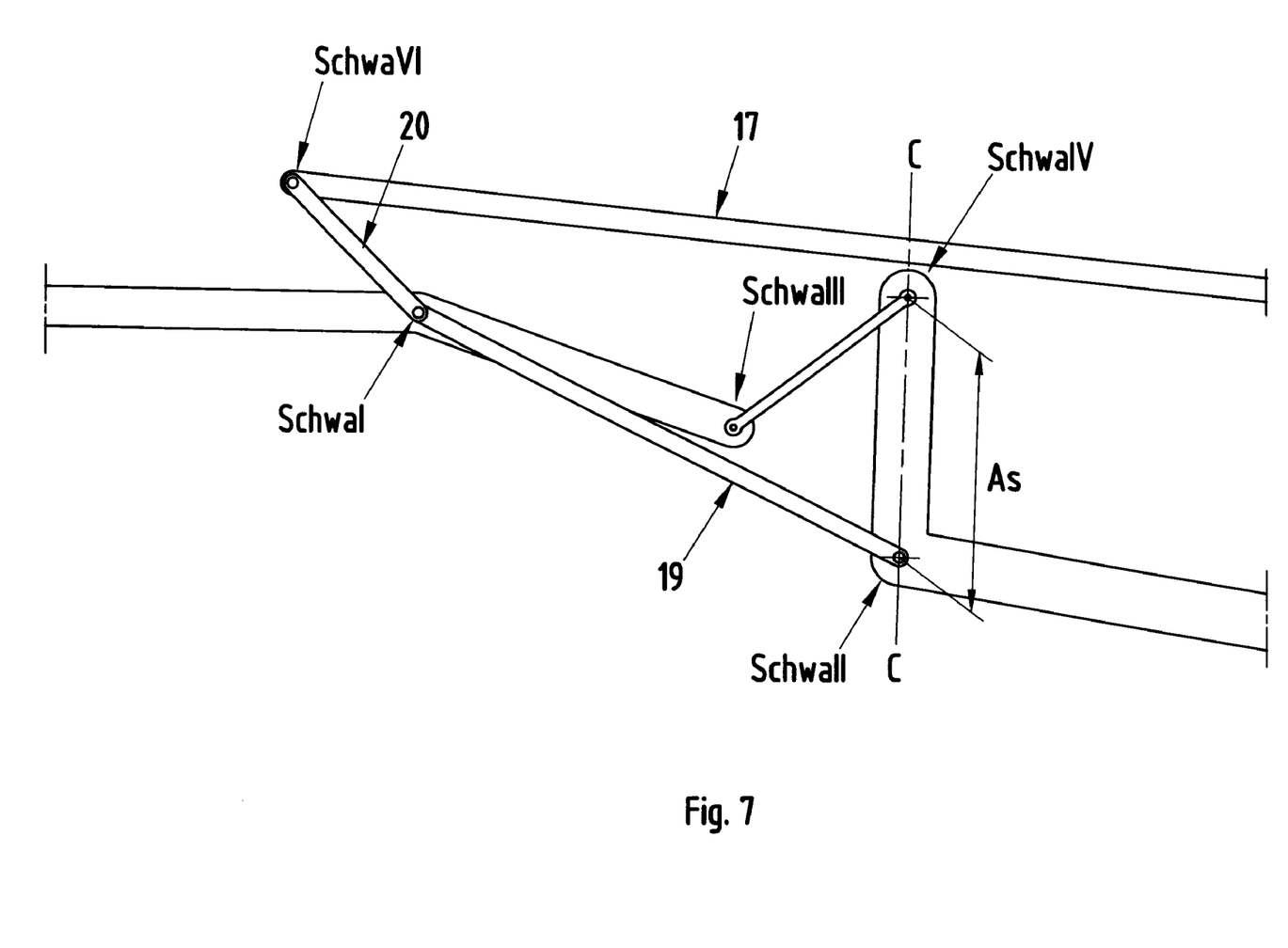
FIG. 7 illustrates an enlarged view of the portion of the operating linkage assembly of the roof in accordance with another embodiment of the present invention within the detail X of FIG. 2 with the roof in the closed position.

Referring now to FIGS. 5, 6, and 7, with continual reference to FIG. 2, roof 2 includes a lever assembly 12 between frame elements 9, 10. Lever assembly 12 is formed by respective end portions of frame elements 9, 10, first and second linkage arms 13, 14, and a control rod 15. The respective end portions of frame elements 9, 10, and linkage arms 13, 14 form a four-bar linkage mechanism 16. The rollover motion of front frame element 9 relative to rear frame element 10 is produced through linkage arms 13, 14.

The end portion of front frame element 9 includes a front end and a rear end as viewed in the direction of forward vehicle travel B. The front end of the end portion of front frame element 9 is higher than the rear end of the end portion of front frame element 9 such that the end portion of front frame element 9 is gradually sloped downward from front to rear.

The end portion of rear frame element 10 includes a bottom end and a top end as viewed in a direction perpendicular to both the first longitudinal side LsI and the roadway. The bottom end of the end portion of rear frame element 10 is under the top end of the end portion of rear frame element 10 such that the end portion of rear frame element 10 extends at a right-angle relative to the body of rear frame element 10.

Linkage arms 13, 14 are formed and located on the respective end portions of frame elements 9, 10 such that they cross when roof 2 moves to an intermediate position (shown in FIG. 5) between the closed position Schst and the opened position Ost. In the closed position Schst, an instantaneous center of rotation Mpol of linkage mechanism 16 lies in the neighborhood of a virtual effective line of action WI of the tension in the material of soft top cover Vb.

First linkage arm 13 is connected at one end to the front end of the end portion of front frame element 9 through a first pivot axis SchwaI and is connected at its other end to the bottom end of the end portion of rear frame element 10 through a second pivot axis SchwaII. Second linkage arm 14 is connected at one end to the rear end of the end portion of front frame element 9 through a third pivot axis SchwaIII and is connected at its other end to the top end of the end portion of rear frame element 10 through a fourth pivot axis SchwaIV. First linkage arm 13 is thus longer than second linkage arm 14. As viewed in the forward direction of vehicle travel B when roof 2 is in the closed position Schst, first pivot axis SchwaI of first linkage arm 13 lies in front of third pivot axis SchwaII of second linkage arm 14 and second pivot axis SchwaII of first linkage arm 13 and fourth pivot axis SchwaIV of second linkage arm 14 are arranged at a distance As in a common plane C-C that is approximately perpendicular.

Control rod 15 is connected at one end to front frame element 9 through a fifth pivot axis SchwaV. Fifth pivot axis SchwaV lies in front of first pivot axis SchwaI in the direction of forward vehicle travel B when roof 2 is in the closed position Schst.

With reference to FIG. 2, control rod 15 is connected at its other end to a roof kinematic system 30. Control rod 15 generally extends over rear frame element 10 along first longitudinal side Ls1 of roof 2 in the longitudinal vehicle direction A-A when roof 2 is in the closed position Schst. Rear frame element 10 is also connected to roof kinematic system 30. Roof kinematic system 30 includes interconnected kinematic linkages and actuators and is connected to control rod 15 and rear frame element 10 to move roof 2 between the closed position Schst (as shown in FIG. 2) and the opened position Ost (as shown in FIG. 3).

Referring now to FIG. 7, linkage assembly 5 in accordance with another embodiment of the present invention will be described. In this embodiment, linkage assembly 5 includes a first linkage arm 19 having an extension 20 instead of first linkage arm 13 and a control rod 17 instead of control rod 15. Control rod 17 is connected at one end to extension 20 of first linkage arm 19 through a sixth pivot axis SchwaVI.

Figure 8:
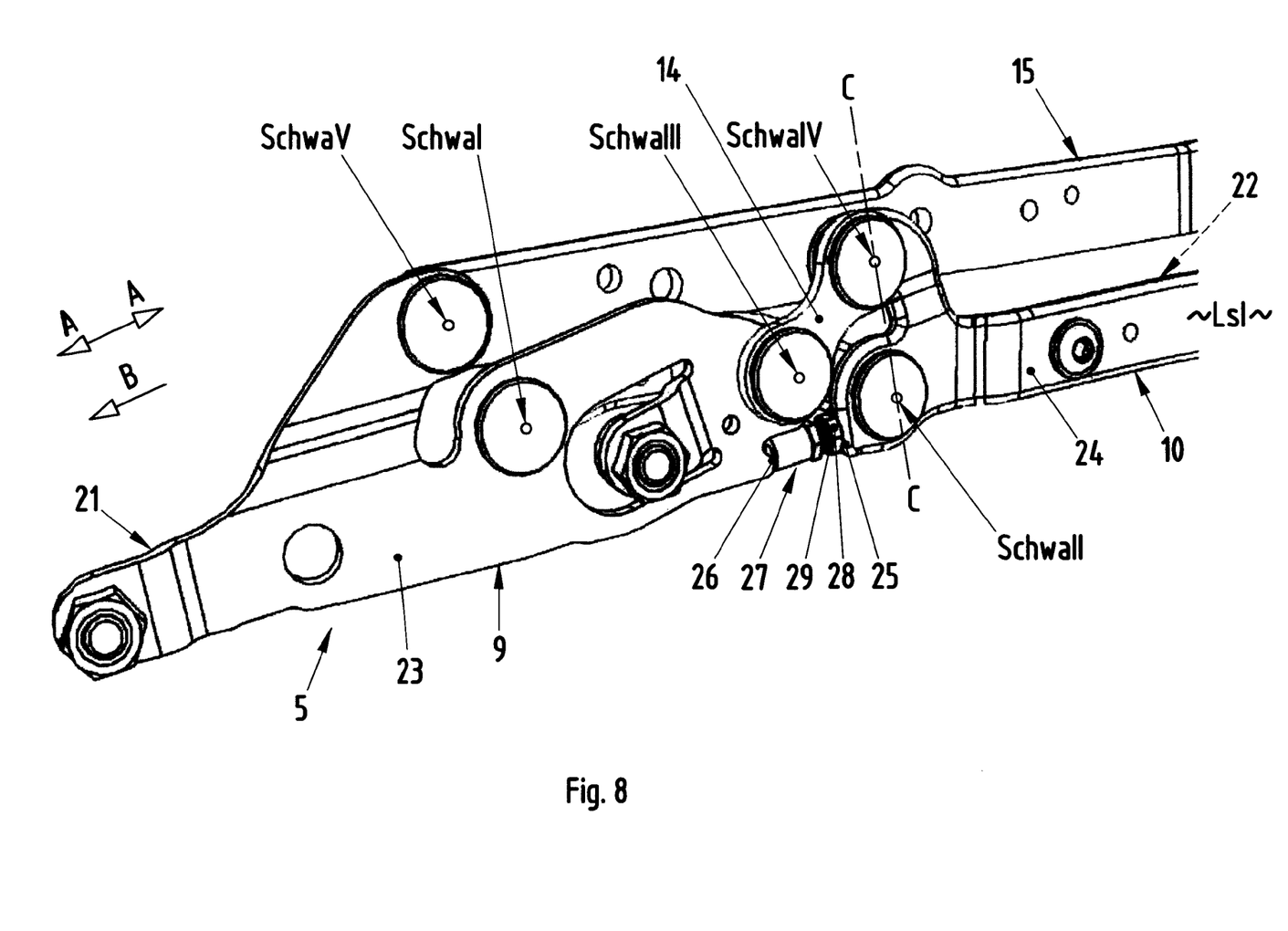
FIG. 8 illustrates a perspective view of a portion of the operating linkage assembly along one side with the roof in the closed position.
Figure 9:
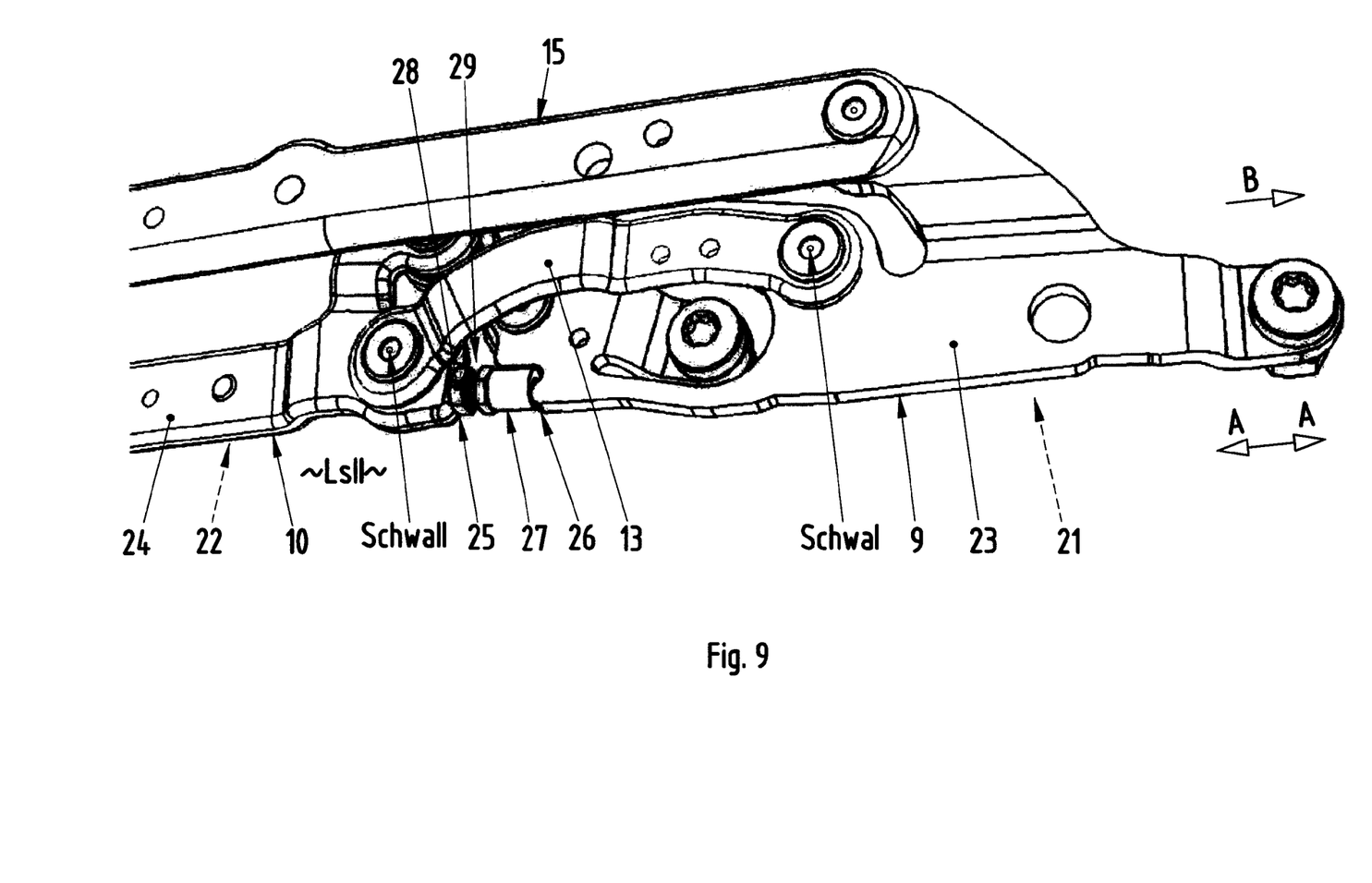
FIG. 9 illustrates a perspective view of a portion of the operating linkage assembly along an opposite side with the roof in the closed position.

Referring now to FIGS. 8 and 9, perspective views of linkage assembly 5 along opposite longitudinal sides LsI and LsII with roof 2 in the closed position Schst are shown. Second linkage arm 14 is located on the second longitudinal side LsII and first linkage arm 13 is located on the first longitudinal side LsI. Frame elements 9, 10 respectively include upright bridge segments 21, 22. Front frame element 9 includes a first sole plate 23 and rear frame element 10 includes a second sole plate 24. Sole plates 23, 24 are in the region of linkage arms 13, 14. Sole plates 23, 24 are connected with their corresponding frame elements 9, 10 through fasteners such as screws. A stop 27 is in the space between facing end regions 25, 26 of respective frame elements 9, 10. Stop 27 performs a stopping function when roof 2 is in the closed position Schst. Stop 27 is mounted on sole plate 23 and is brought up to sole plate 24 with a headpiece 28. Stop 27 is adjustable in the longitudinal direction of the vehicle A-A by an adjusting mechanism 29.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A linkage assembly for a folding roof, the linkage assembly comprising:
   a front frame element having a rear end portion extending at an acute angle therefrom, the rear end portion having a front end joined to the front frame element and a rear end;
   a rear frame element having a front end portion extending substantially at a right angle therefrom, the front end portion having a bottom end joined to the rear frame element and a top end;
   a first linkage arm having a front end and a rear end, the front end of the first linkage arm being pivotally connected to the front end of the rear end portion of the front frame element, the rear end of the first linkage arm being pivotally connected to the bottom end of the front end portion of the rear frame element;
   a second linkage arm having a front end and a rear end, the front end of the second linkage arm being pivotally connected to the rear end of the rear end portion of the front frame element, the rear end of the second linkage arm being pivotally connected to the top end of the front end portion of the rear frame element; and
   a control rod having a front end connected to the front frame element such that pulling movement of the front end of the control rod towards the rear frame element when the front frame element is in the closed position causes the front frame element to move to the opened position and such that pushing movement of the front end of the control rod away from the rear frame element when the front frame element is in the opened position causes the front frame element to move to the closed position;
   wherein the front frame element is movable relative to the rear frame element via the pivotal connections of the linkage arms and the end portions of the frame elements between a closed position in which the frame elements are extended from one another along a longitudinal direction and an opened position in which the front frame element is folded over the rear frame element with the rear end portion of the front frame element being folded over the front end portion of the rear frame element.

2. The linkage assembly of claim 1 wherein:
   the front frame element moves through an angular path of 180° relative to the rear frame element when moving between the closed and opened positions.

3. The linkage assembly of claim 1 wherein:
   the front frame element performs a rollover motion relative to the rear frame element when the front frame element moves from the closed position to the opened position.

4. The linkage assembly of claim 1 wherein:
   the linkage arms cross one another when the front frame element moves between the closed and opened positions.

5. The linkage assembly of claim 1 wherein:
   an instantaneous center of rotation of the pivotal connections between the linkage arms and the end portions of the frame elements lies in the neighborhood of a virtual effective line of action of the tension in the material of a soft top cover when the front frame element is in the closed position.

6. The linkage assembly of claim 1 wherein:
   the first linkage arm is longer than the second linkage arm.

7. The linkage assembly of claim 1 wherein:
   the front end of the first linkage arm is pivotally connected to the front end of the rear end portion of the front frame element at a first pivot axis;
   the front end of the second linkage arm is pivotally connected to the rear end of the rear end portion of the front frame element at a third pivot axis;
   wherein the first pivot axis lies in front of the third pivot axis when the front frame element is in the closed position.

8. The linkage assembly of claim 7 wherein:
   the rear end of the first linkage arm is pivotally connected to the bottom end of the front end portion of the rear frame element at a second pivot axis;
   the rear of the second linkage arm is pivotally connected to the top end of the front end portion of the rear frame element at a fourth pivot axis;
   wherein the second pivot axis lies beneath the fourth pivot axis.

9. A linkage assembly for a folding roof, the linkage assembly comprising:
   a front frame element having a rear end portion extending at an acute angle therefrom, the rear end portion having a front end joined to the front frame element and a rear end;
   a rear frame element having a front end portion extending substantially at a right angle therefrom, the front end portion having a bottom end joined to the rear frame element and a top end;
   a first linkage arm having a front end and a rear end, the front end of the first linkage arm being pivotally connected to the front end of the rear end portion of the front frame element, the rear end of the first linkage arm being pivotally connected to the bottom end of the front end portion of the rear frame element;
   a second linkage arm having a front end and a rear end, the front end of the second linkage arm being pivotally connected to the rear end of the rear end portion of the front frame element, the rear end of the second linkage arm being pivotally connected to the top end of the front end portion of the rear frame element; and
   a stop between the frame elements;
   wherein the front frame element is movable relative to the rear frame element via the pivotal connections of the linkage arms and the end portions of the frame elements between a closed position in which the frame elements are extended from one another along a longitudinal direction and an opened position in which the front frame element is folded over the rear frame element with the rear end portion of the front frame element being folded over the front end portion of the rear frame element.

10. The linkage assembly of claim 9 further comprising:
    a control rod having a front end;
    wherein the first linkage arm includes an extension extending from the front end of the first linkage arm;
    wherein the front end of the control rod is connected to the extension of the first linkage arm such that pulling movement of the front end of the control rod towards the rear frame element when the front frame element is in the closed position causes the front frame element to move to the opened position and such that pushing movement of the front end of the control rod away from the rear frame element when the front frame element is in the opened position causes the front frame element to move to the closed position.

11. The linkage assembly of claim 9 wherein:
the stop includes an adjusting mechanism that acts in the longitudinal direction of the frame elements.

12. The linkage assembly of claim 1 wherein:
the first linkage arm and the second linkage arm are respectively on opposing longitudinal sides of the frame elements.

13. The linkage assembly of claim 1 wherein:
the rear end portion of the front frame element includes a sole plate in the region of the first linkage arm and the front end portion of the rear frame element includes a sole plate in the region of the second linkage arm.

14. A linkage assembly for a folding roof, the linkage assembly comprising:
a front frame element having a rear end portion extending at an acute angle therefrom, the rear end portion having a front end joined to the front frame element and a rear end;
a rear frame element having a front end portion extending substantially at a right angle therefrom, the front end portion having a bottom end joined to the rear frame element and a top end;
a first linkage arm having a front end and a rear end, the front end of the first linkage arm being pivotally connected to the front end of the rear end portion of the front frame element, the rear end of the first linkage arm being pivotally connected to the bottom end of the front end portion of the rear frame element; and
a second linkage arm having a front end and a rear end, the front end of the second linkage arm being pivotally connected to the rear end of the rear end portion of the front frame element, the rear end of the second linkage arm being pivotally connected to the top end of the front end portion of the rear frame element;
wherein the front frame element is movable relative to the rear frame element via the pivotal connections of the linkage arms and the end portions of the frame elements between a closed position in which the frame elements are extended from one another along a longitudinal direction and an opened position in which the front frame element is folded over the rear frame element with the rear end portion of the front frame element being folded over the front end portion of the rear frame element;
wherein the rear end portion of the front frame element includes a sole plate in the region of the first linkage arm and the front end portion of the rear frame element includes a sole plate in the region of the second linkage arm;
the linkage assembly further comprising a stop between the sole plates.

15. A folding roof for a vehicle, the folding roof comprising:
a soft top cover;
a plurality of bows;
a first linkage assembly extending along a first longitudinal side;
a second linkage assembly extending along a second opposite longitudinal side;
wherein the bows extend between the linkage assemblies with the soft top cover thereon;
wherein each linkage assembly includes a front frame element, a rear frame element, a first linkage arm, and a second linkage arm;
wherein the front frame element has a rear end portion extending at an acute angle therefrom, the rear end portion having a front end joined to the front frame element and a rear end, the rear frame element having a front end portion extending substantially at a right angle therefrom, the front end portion having a bottom end joined to the rear frame element and a top end;
wherein the first linkage arm has a front end and a rear end, the front end of the first linkage arm being pivotally connected to the front end of the rear end portion of the front frame element, the rear end of the first linkage arm being pivotally connected to the bottom end of the front end portion of the rear frame element; and
wherein the second linkage arm has a front end and a rear end, the front end of the second linkage arm being pivotally connected to the rear end of the rear end portion of the front frame element, the rear end of the second linkage arm being pivotally connected to the top end of the front end portion of the rear frame element;
wherein the front frame element is movable relative to the rear frame element via the pivotal connections of the linkage arms and the end portions of the frame elements between a closed position in which the frame elements are extended from one another along a longitudinal direction and an opened position in which the front frame element is folded over the rear frame element with the rear end portion of the front frame element being folded over the front end portion of the rear frame element;
wherein each linkage assembly includes a control rod having a front end connected to the front frame element such that pulling movement of the front end of the control rod towards the rear frame element when the front frame element is in the closed position causes the front frame element to move to the opened position and such that pushing movement of the front end of the control rod away from the rear frame element when the front frame element is in the opened position causes the front frame element to move to the closed position.

16. The folding roof of claim 15 wherein:
the first linkage arm is longer than the second linkage arm.

17. The folding roof of claim 15 wherein:
the front end of the first linkage arm is pivotally connected to the front end of the rear end portion of the front frame element at a first pivot axis;
the front end of the second linkage arm is pivotally connected to the rear end of the rear end portion of the front frame element at a third pivot axis;
wherein the first pivot axis lies in front of the third pivot axis when the front frame element is in the closed position.

18. The folding roof of claim 17 wherein:
the rear end of the first linkage arm is pivotally connected to the bottom end of the front end portion of the rear frame element at a second pivot axis;
the rear of the second linkage arm is pivotally connected to the top end of the front end portion of the rear frame element at a fourth pivot axis;
wherein the second pivot axis lies beneath the fourth pivot axis.

* * * * *